United States Patent [19]

Scarpa

[11] Patent Number: 5,325,204
[45] Date of Patent: Jun. 28, 1994

[54] NARROWBAND INTERFERENCE CANCELLATION THROUGH THE USE OF DIGITAL RECURSIVE NOTCH FILTERS

[75] Inventor: Carl G. Scarpa, Edison, N.J.

[73] Assignee: Hitachi America, Ltd., Tarrytown, N.Y.

[21] Appl. No.: 134,357

[22] Filed: Oct. 8, 1993

Related U.S. Application Data

[63] Continuation-in-part of Ser. No. 103,933, Aug. 6, 1993, which is a continuation-in-part of Ser. No. 3,714, Jan. 13, 1993, which is a continuation-in-part of Ser. No. 882,851, May 14, 1992.

[51] Int. Cl.$^5$ .................. H04N 5/21; H04N 7/00; H04N 5/44; H04N 11/00
[52] U.S. Cl. ............................ 348/607; 375/103; 364/724.17; 364/724.19; 455/307; 348/711; 348/469
[58] Field of Search ............... 358/36, 86, 167, 141, 358/142, 188, 38, 149, 83, 166, 37; 455/296, 295, 307, 306, 305, 303; 375/103, 99, 101; 364/724.01, 724.08, 724.06, 724.17, 724.19; 328/166, 167; 333/176, 167, 166; H04N 5/21, 7/00, 11/00, 5/44

[56] References Cited

U.S. PATENT DOCUMENTS

| | | | |
|---|---|---|---|
| 3,744,015 | 7/1973 | Marimon et al. | 455/307 |
| 3,967,102 | 6/1976 | McCown | 328/167 X |
| 4,117,541 | 9/1978 | Ali | 364/724 |
| 4,199,660 | 4/1980 | Dill et al. | 370/50 |
| 4,480,236 | 10/1984 | Harris | 333/166 |
| 4,549,312 | 10/1985 | Michaels et al. | 455/307 |
| 4,589,083 | 5/1986 | Le Dinh et al. | 364/724.19 |
| 4,667,225 | 5/1987 | Kanda | 348/624 |
| 4,673,982 | 6/1987 | Tam et al. | 348/607 |
| 4,954,785 | 9/1990 | Segaram | 328/167 |
| 5,031,194 | 7/1991 | Crespo et al. | 375/14 |
| 5,051,963 | 9/1991 | Linville, Jr. et al. | 364/724.01 |
| 5,058,139 | 10/1991 | Egler | 375/103 |

(List continued on next page.)

OTHER PUBLICATIONS

Daltorro, Jon, "The Implementation of Recursive Digital Filters for High-Fidelity Audio", J. Audio Eng. Soc., vol. 36, No. 11, 1988 Nov., pp. 851-877.

(List continued on next page.)

Primary Examiner—James J. Groody
Assistant Examiner—Safet Metjahic
Attorney, Agent, or Firm—Kenyon & Kenyon

[57] ABSTRACT

A digital notch filter apparatus for removing narrowband interference signals from a wideband communication signal. The apparatus includes a recursive digital passband interference acquisition filter, an acquisition mode center frequency control circuit, a recursive digital passband interference tracking filter, a tracking mode center frequency control circuit and an interference detection circuit. The tracking filter has a narrower bandwidth than the acquisition filter. Both the acquisition and tracking filters are gang tuned so that the center frequencies of their passbands are adjusted in unison. During interference acquisition mode, the acquisition mode center frequency control circuit is used is to adjust the center frequency of the filters over the bandwidth covered by the interference canceler. When the interference detection circuit detects an interference signal within the passband of the tracking filter, the tracking center frequency control circuit is used to adjust the center frequency of the acquisition and tracking filters to insure that the filters remain locked onto the narrowband interference signal. Upon detection of the interference signal, the portion of the communication signal which includes the narrowband interference signal that is passed through the narrow passband tracking filter is subtracted from the communication signal to remove the narrowband interference signal. When no interference signal is detected, the communication signal is permitted to pass to the output of the notch filter circuit without attenuation.

8 Claims, 5 Drawing Sheets

U.S. PATENT DOCUMENTS

| | | | |
|---|---|---|---|
| 5,086,340 | 2/1992 | Citta et al. | 358/141 |
| 5,087,975 | 2/1992 | Citta et al. | 358/183 |
| 5,121,203 | 6/1992 | Citta | 358/141 |
| 5,121,208 | 6/1992 | Citta et al. | 358/166 |
| 5,132,797 | 7/1992 | Citta | 358/167 |
| 5,136,386 | 8/1992 | Okada et al. | 358/167 |
| 5,157,697 | 10/1992 | Anuari et al. | 455/295 X |
| 5,162,900 | 11/1992 | Citta | 358/167 |
| 5,222,106 | 6/1993 | Satoh et al. | 375/103 |
| 5,235,612 | 8/1993 | Stilwell et al. | 375/99 |
| 5,263,048 | 11/1993 | Wade | 375/99 X |

OTHER PUBLICATIONS

E. P. Darbyshire, "Narrowband Interference Identification and Rejection Applied to Baseband Radio Signals", IEE Conference Publication n.325. Published by IEE, Michael Faraday House, Stevenage, Engl., 1990, pp. 217–221.

General Instrument Corporation Videocipher Division, "Digicipher HDTV System Description", Aug. 22, 1991, pp. 31–40, pp. 49–60.

Zenith, AT&T, "Technical Details, Digital Spectrum Compatible", Sep. 23, 1991, pp. 3–4, 51–56, 67–110.

David Sarnoff Research Center, Philips Laboratories, "Advanced Digital Television, System Description", Jan. 20, 1992, pp. v–vii, 69–113.

Advanced Television Research Consortium, "Advanced Digital Television, Prototype Hardware Description", Feb. 12, 1992, pp. 8–10, 45–57.

McMann, R. H., et al., "A Digital Noise Reducer for Encoded NTSC Signals", SMPTE Journal, Mar. 1978, vol. 87, No. 3, pp. 129–133.

NARROWBAND INTERFERENCE CANCELLATION THROUGH THE USE OF DIGITAL RECURSIVE NOTCH FILTERS

RELATED APPLICATION

This is a continuation-in-part of U.S. application Ser. No. 08/103,933, filed Aug. 6, 1993, which is a continuation-in-part of U.S. application Ser. No. 08/003,714, filed Jan. 13, 1993, which is a continuation-in-part of U.S. application Ser. No. 882,851, filed May 14, 1992.

FIELD OF THE INVENTION

The present invention is directed to signal interference cancelers and, more particularly, to an apparatus which uses one or more recursive digital notch filter circuits to remove narrowband interference from a wideband communication signal.

BACKGROUND OF THE INVENTION

Wideband communication broadcasts, e.g., high definition television ("HDTV") broadcasts, may suffer from narrowband interference signals produced by numerous different sources including, e.g., Citizen Band radio harmonics, HAM radio, land mobile, etc.

In addition, cable television broadcasts may suffer from narrowband interference which results from testing of the cable system during normal operation. For example, known cable television signal testing procedures sweep a narrow tone signal across the cable television system's broadcast frequency spectrum during normal operation to check the transmission quality of the system. To a cable television viewer this narrowband test tone appears as a narrowband interference signal which interferes with television reception.

Accordingly, it is desirable to provide a means of eliminating or reducing narrowband interference signals from wideband communication signals being received by, is e.g., a HDTV receiver or a cable television system to thereby improve reception.

Current techniques used to avoid interference by many HDTV system proponents only address NTSC television signal interference which results from the simulcasting of HDTV signals and NTSC signals in the same frequency spectrum. Such NTSC interference occurs at predictable frequencies. Furthermore, NTSC interference peaks due to NTSC audio carrier, chrominance subcarrier and picture carrier signals being spaced at predictable frequency intervals from each other. Thus, NTSC interference, with its known frequency spacing, lends itself to interference cancellation techniques, such as the use of comb filters having fixed frequency spacing between notches, which are not generally applicable to the removal of narrowband interference signals of unknown frequency and intensity.

The general failure of proposed HDTV systems to address the problem of narrowband signal interference from sources other than NTSC signals, and particularly narrowband interference from sources of unknown frequency, decreases a HDTV receiver's ability to detect, decode, and display HDTV signals in areas where narrowband signal interference from, e.g., a ham radio, is present.

Accordingly, a narrowband interference canceler which can operate without a priori information about an interference signal is needed in order to improve reception of wideband communication signals by removing narrowband interference signals when present.

SUMMARY OF THE INVENTION

The present invention provides a method and apparatus for attenuating narrowband signal interference present in wideband communication broadcasts, e.g., high definition television ("HDTV") and cable television broadcasts.

The use of recursive digital notch filter circuits to remove NTSC signal interference, from a HDTV signal, which is one exemplary type of narrowband interference signal, is described in detail in pending U.S. Pat. application Ser. No. 08/103,933, filed Aug. 6, 1993, which is hereby expressly incorporated by reference.

In accordance with the present invention, one or more recursive digital notch filter circuits are used to remove narrowband interference signals, including interference signals other than NTSC interference signals, from a wideband communication signal.

In one exemplary embodiment, a plurality of notch filter circuits are connected in series with each of the other notch filter circuits comprising the interference canceler. In such an embodiment, each notch filter circuit is designed to attenuate a narrowband interference signal from the wideband communication signal when the individual notch filter circuit detects a narrowband interference signal, and to pass the wideband communication signal without attenuation when no narrowband interference signal is detected. Each notch filter may be used to remove a narrowband interference signal from a different frequency band of the wideband communication signal's frequency spectrum. When a plurality of notch filter circuits are used, each notch filter circuit may be identical except for the frequency band each particular notch filter circuit is designed to cover.

In accordance with the present invention, each notch filter circuit operates independently from the other notch filter circuits. The notch filter circuits operate in two modes, interference acquisition mode, and tracking mode.

In one embodiment, each notch filter circuit comprises a recursive passband tracking filter with an adjustable center frequency, an acquisition mode center frequency control circuit, a tracking mode center frequency control circuit and an interference detector.

During the interference acquisition mode, i.e., when no narrowband interference signal has been detected within the passband of the tracking filter, the acquisition mode center frequency control circuit adjusts the center frequency of the passband tracking filter to scan through the series of frequencies from which the notch filter circuit is designed to eliminate narrowband interference.

The interference detector monitors the output of the tracking filter and controls the notch filter circuit to switch from acquisition mode to tracking mode upon the detection of a narrowband interference signal within the passband of the tracking filter.

Upon entering tracking mode, the tracking center frequency control circuit controls the center frequency of the tracking filter to insure that the center frequency of the passband tracking filter remains centered with the detected narrowband interference signal.

In one embodiment, the tracking center frequency control circuit adjusts the center frequency of the passband tracking filter in fines increments than does the acquisition mode center frequency control circuit. This provides for faster acquisition of an interference signal than would be possible using merely the tracking center frequency control circuit.

During the interference acquisition mode, the notch filter circuit passes the received wideband communication signal received at its input to its output without attenuation, i.e., during acquisition mode the notch filter circuit is effectively disconnected. However, when an interference signal is detected and the notch filter circuit enters the tracking mode, the output of the notch filter circuit's passband tracking filter, which includes the portion of the interference signal passed by the tracking filter, is subtracted from the received communication signal. In this manner, the notch filter circuit places a notch at the location of the detected narrowband interference signal to thereby reduce or eliminate the narrowband interference signal.

Thus, the narrowband interference canceler of the present invention can be used to remove narrowband interference signals from a wideband communication signal, such as a HDTV broadcast signal, to thereby improve reception.

DETAILED DESCRIPTION

Figure 1:
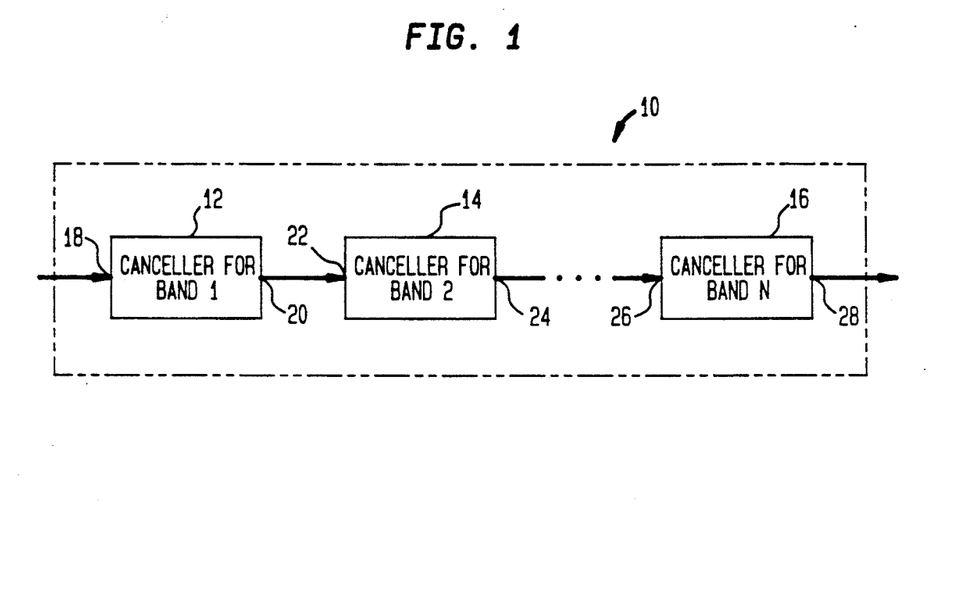
FIG. 1 is a schematic block diagram of a narrowband interference canceler according to one embodiment of the present invention.

Referring now to the drawings, and initially to FIG. 1, there is illustrated a narrowband interference canceler according to the present invention, generally indicated by the reference numeral 10. In accordance with one embodiment of the present invention, the narrowband interference canceler 10 comprises n serially connected recursive digital notch filter circuits represented by reference numerals 12, 14, 16. Each of the first through N$^{th}$ notch filter circuits 12, 14, 16 is used to detect and attenuate narrowband interference signals located within a corresponding first through Nth frequency band.

While the interference canceler 10 may comprise a single notch filter circuit 12, 14, or 16 capable of eliminating narrowband interference in a single frequency band, in the exemplary embodiment illustrated in FIG. 1, a plurality of notch filter circuits 12, 14, 16 are arranged in series to detect and attenuate narrowband interference signals over a wide range of frequencies, e.g., the entire frequency spectrum of a preselected wideband communication signal such as a HDTV broadcast signal. The use of multiple notch filter circuits 12, 14, 16 permits the cancellation of multiple interference signals or tones while providing for faster detection and lock-on to an interfering signal than would be possible through the use of a single notch filter circuit to cover the same frequency range.

Each of the notch filter circuits 12, 14, 16, illustrated in FIG. 1, has an input 18, 22, 26 for receiving the wideband communication signal to be filtered and an output 20, 24, 28 for outputting the filtered communication signal. Each filter circuit 12, 14, 16 operates independently from the other filter circuits 12, 14, 16. As will be discussed below, each notch filter circuit 12, 14, 16 includes circuitry for detecting narrowband interference within the filter's frequency band and for attenuating detected interference signals. When an individual notch filter circuit 12, 14, 16 does not detect interference within its frequency band, the signal received at the filter's input 18, 22, or 26 is permitted to pass through to the filter circuit's output 20, 24 or 28 without attenuation.

As illustrated in FIG. 1, the input 18 of the first notch filter circuit 12 serves as the signal input of the narrowband interference canceler 10. The output 20 of the first notch filter circuit 12 is coupled to the corresponding input 22 of the second notch filter circuit 14 which, in turn, has its output 24 coupled to the subsequent notch filter in the series of n notch filter circuits 12, 14, 16. Accordingly, the (N−1) notch filter circuit has its output coupled to the input 26 of the N$^{th}$ notch filter 16. The output of the N$^{th}$ notch filter circuit 28 serves as the output of the narrowband interference canceler 10 of the present invention. In this manner, the n notch filter circuits 12, 14, 16 are connected together in series.

Figure 2:
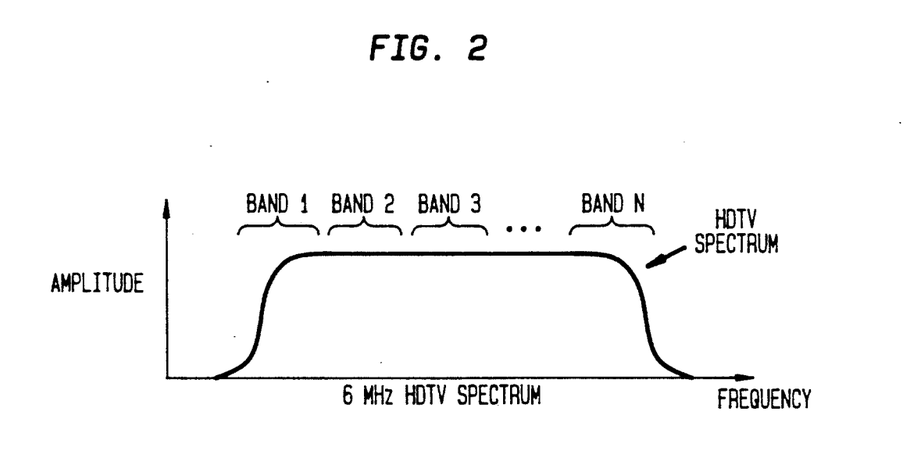
FIG. 2 is a diagram illustrating how the N notch filter circuits of the interference canceler illustrated in FIG. 1 may be used to cancel n frequency bands covering the entire frequency range of a wideband HDTV communication signal.

Referring now to FIG. 2, there is illustrated a frequency amplitude response curve generally representing the transmission signal for one proposed HDTV communication system. As illustrated, the wideband HDTV signal may have, e.g., a 6 Mega Hz bandwidth. In accordance with is the present invention, a narrowband interference canceler 10 may be used to remove narrowband interference, e.g., interference having a bandwidth of 100 KHz or less, from the 6 MHz HDTV signal. As illustrated, each one of the n notch filter circuits 12, 14, 16 are responsible for removing interference from a corresponding portion of the 6 MHz frequency spectrum comprising the HDTV signal. In this manner, by using a sufficient n number of notch filter circuits 12, 14, 16 narrowband interference can be filtered from a wideband communication signal, such as the illustrated HDTV signal, over the full portion of the frequency spectrum of the wideband communication signal. Alternatively, a lesser number of notch filter circuits 12, 14, 16 may be used to remove interference over a more limited range of frequencies or a limited number of notch filter circuits 12, 14, 16 with relatively large acquisition ranges may be used to filter interference signals over the entire bandwidth of the wideband communication signal.

Figures 3, 3B:
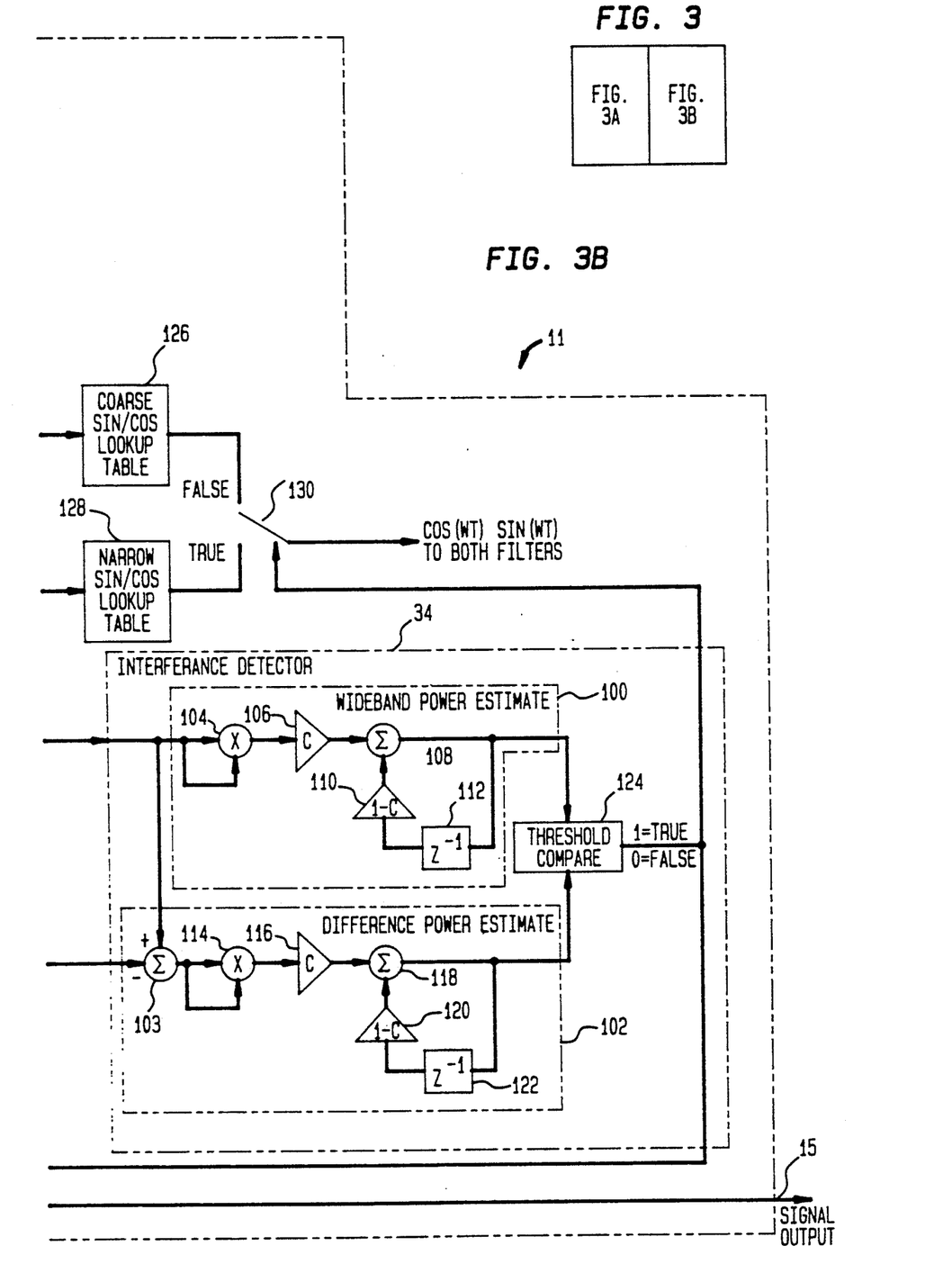
FIG. 3, which represents the combination of FIGS. 3A and 3B, is a block diagram of a recursive digital filter circuit which may be used as any one of the notch filter circuits of the NTSC signal interference canceler illustrated in FIG. 1.
Figure 3A:
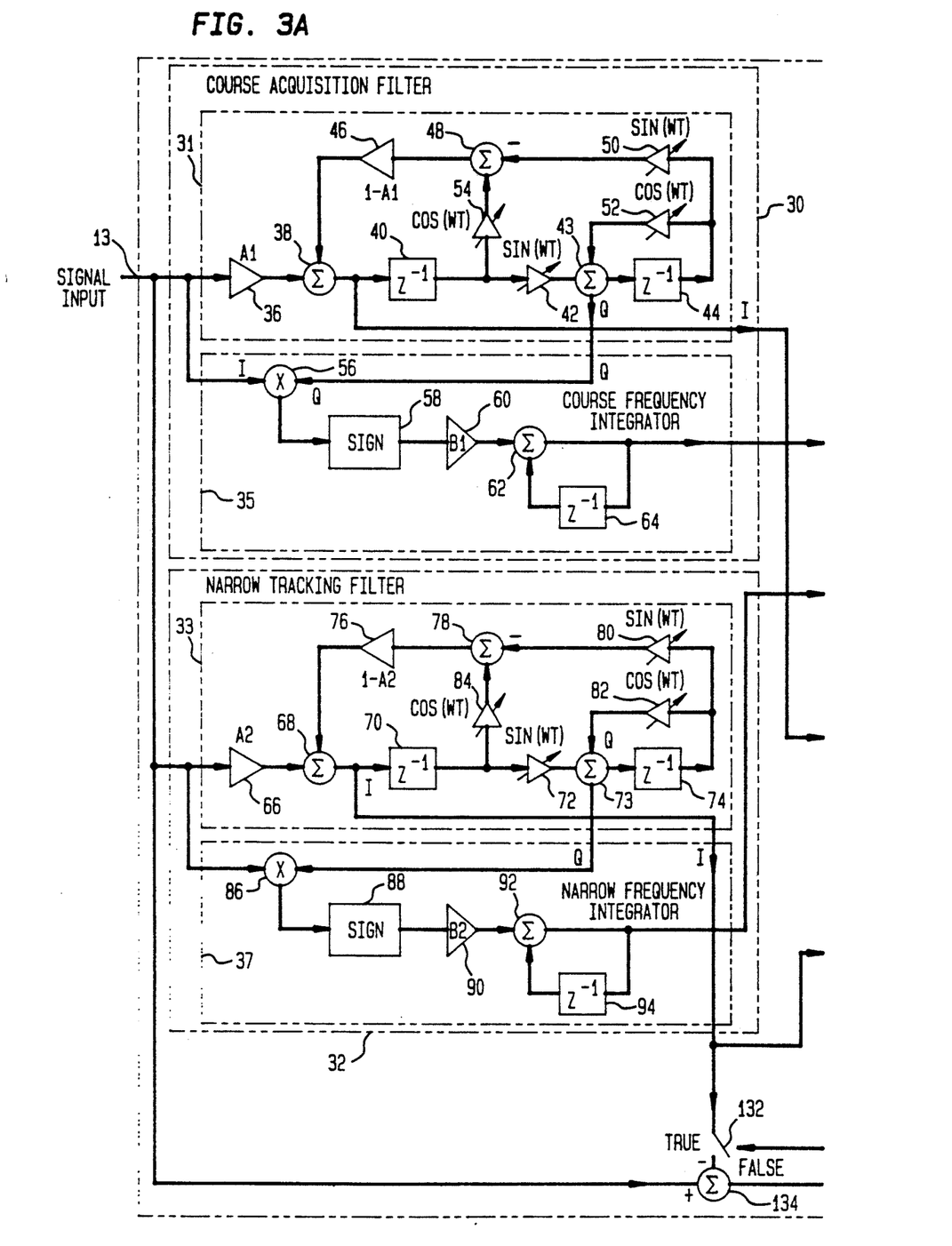

Referring now to FIG. 3, there is illustrated a recursive digital notch filter circuit 11 which may be used in an exemplary embodiment of the present invention as any one of the n notch filter circuits 12, 14, 16 of the narrowband interference canceler 10.

As illustrated in FIG. 3, the recursive digital notch filter circuit 11 comprises a course acquisition filter 30, a narrow tracking filter 32, an interference detector 34, a coarse sin/cos lookup table 126, a narrow sin/cos lookup table 128, a first control switch 130, a second control switch 132 and a summer 134.

Figure 5:
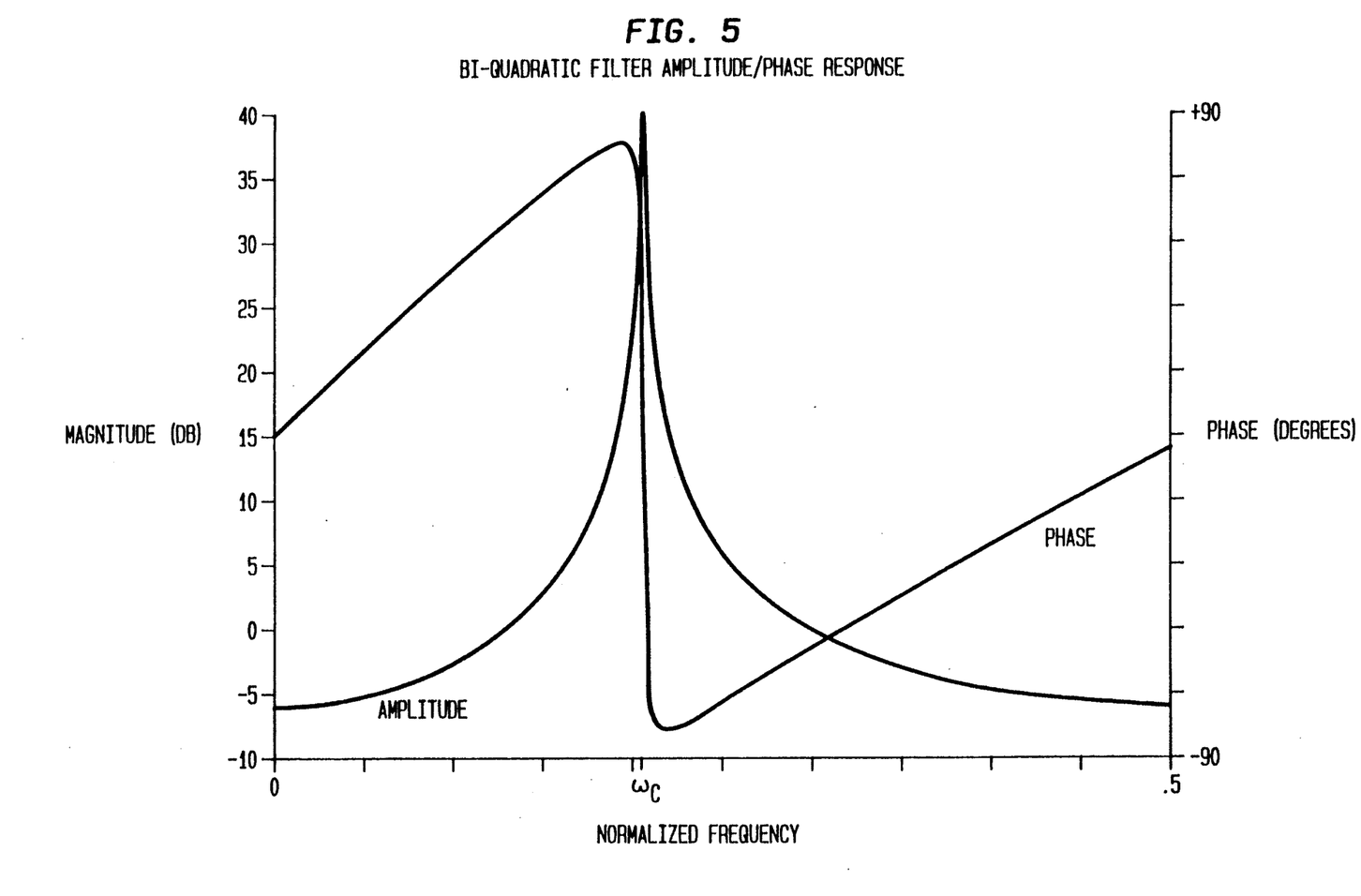
FIG. 5 is an amplitude and phase response curve representative of the general phase response characteristics of the course acquisition filter illustrated in FIG. 3.

As will be described in greater detail below, the course acquisition filter 30 is used for course acquisition of the interference signal while the output of the narrow tracking filter 32 is used to cancel the detected interference signal. For design simplicity, in one embodiment of the present invention, both the course acquisition filter 30 and the narrow tracking filter 32 are implemented using bi-quadratic digital infinite impulse response passband filters. That is, both filters 30, 32 are implemented as recursive digital passband filters having adjustable center frequencies, with an unity gain and zero phase shift at the filter's center frequency. Furthermore, both filters 30, 32 are designed to have a narrow bandwidth. As will be described below, each of the filters 30, 32 include a center frequency control circuit 35, 37 incorporates an infinite impulse response ("IIR") frequency integrator for controlling the center frequency of the filters 30, 32. As illustrated in FIG. 5, the filters 30, 32 have a phase shift of zero at the filter's center frequency. This feature of the filters 30, 32 is used in conjunction with a correlation operation, as will be discussed below, to facilitate the adjustment of the filters' center frequencies to match the frequency of detected interference signals.

Referring now briefly to FIG. 5, there is illustrated a set of amplitude phase response curves characteristic of the general shape of the curves from the amplitude and phase response of the filters 30, 32. It should be noted that the values set forth in FIG. 5 will vary depending on the selected bandwidth of each of the filters 30, 32.

Referring again to FIG. 3, it can be seen that the course acquisition filter 30 comprises a recursive digital passband filter circuit 31 and the acquisition mode center frequency control circuit 35.

The recursive digital passband filter circuit 31 comprises a first and second fixed gain weight elements 36, 46 having gains of A1 and (1−A1) respectively, where A1 is a selected real value equal to or less than 1, a first and second unit delay element 40, 44, a first through third summer 38, 43, 48 and a first through fourth adjustable weight element 42, 52, 50, 54. The first through fourth adjustable weight elements 42, 52, 50, 54 have a gain of $\sin(\omega(t))$, $\cos(\omega(t))$, $\sin(\omega(t))$, $\cos(\omega(t))$, respectively.

The signal input 13 of the filter circuit 11 is coupled to the input of the first fixed gain weight element 36 which in turn has an output coupled to a first summing input of the first summer 38. The first summer 38, which generates the in-phase signal output by the passband acquisition filter circuit 31, and thus the course acquisition filter 30 has an in-phase signal output coupled to the input of the first unit delay element 40 and a first input of the interference detector circuit 34. The first unit delay element 40 has an output which is coupled to the input of the first variable weight element 42 and the input of the fourth variable weight element 54. The first variable weight element 42, in turn, has an output coupled to the first summing input of the second summer 43.

The second summer 43 generates the quadrature-phase signal output by the passband acquisition filter circuit 31. The second summer 43 has a first quadrature-phase signal output coupled to the input of the second unit delay element 44 and a second quadrature-phase signal output coupled to the input of the center frequency control circuit 35. The second unit delay element 44, in turn, has an output coupled to the input of the second and third variable gain weight elements 52, 50. The second variable weight element 52 has its output coupled to the second input of the second summer 43 while the third variable gain weight element 50 has an output coupled to a first input of a summer 48. A second input of the summer 48 is coupled to the output of the fourth variable gain weight element 54. An output of the third summer 48 is coupled to the input of the second fixed gain weight element 46 which, in turn, has its output coupled to the second input of the first summer 38.

The passband acquisition filter circuit 31 receives the communication signal supplied to the input of the digital notch filter circuit 11 and filters the communication signal by passing the portion of the received signal which falls within the passband of the passband acquisition filter 31. In this manner, in-phase and quadrature-phase output signals are generated.

The acquisition mode frequency control circuit 35 of the passband filter 30 comprises a cross correlator 56, and a frequency integrator circuit which comprises a sign detector 58, a fixed gain element 60, a unit delay element 64 and a summer 62. An in-phase signal input of the cross correlator 56 is coupled to the signal input 13 of the course acquisition filter 30 while a quadrature phase signal input of the cross correlator 56 is coupled to the quadrature phase signal output of the passband filter circuit 31. In this manner, the cross correlator 56 receives both the input signal to the filter circuit 11 and the quadrature-phase signal output by the passband filter 31. These signals are cross correlated to generate a frequency error signal which is supplied to the input of the frequency integrator's sign detector 58. The use of the cross-correlator and the frequency integrator in controlling the center frequency of the filters 31, 33 will be discussed below.

The sign detector 58 generates an output signal as a function of the sign of the received error frequency signal. The output of the sign detector 58 is coupled to the input of the fixed gain element 60 which has a gain of B1 and an output coupled to a first input of the frequency integrator's summer 62. The summer 62 has a second input coupled to the output of the frequency integrator's unit delay element 64.

The frequency integrator serves to integrate the frequency error signal over time with the step size, and thus the rate of change in the value of the frequency correction signal, being controlled by the value B1. The frequency integrator's summer 62 has a frequency correction signal output coupled to the input of the frequency integrator's unit delay element 64 and the frequency control signal output of the course acquisition filter 30.

Figure 4:
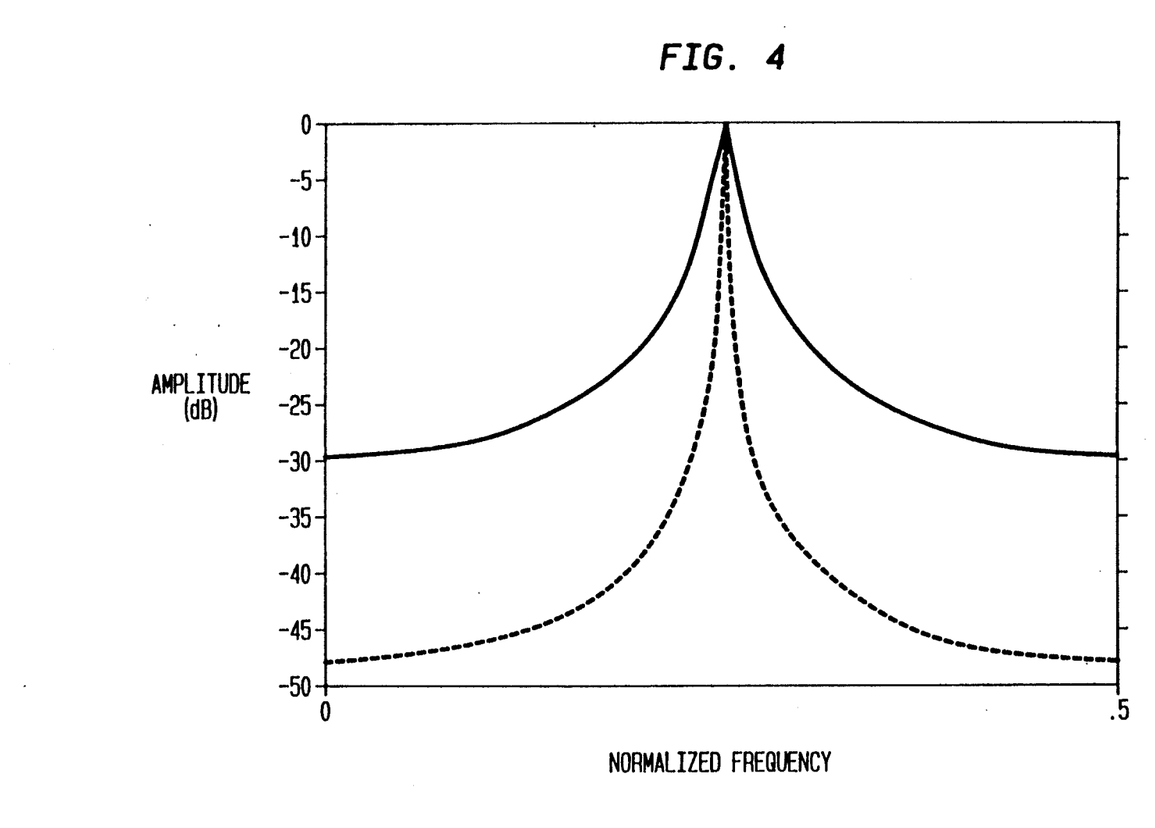
FIG. 4 is a diagram illustrating an exemplary amplitude and frequency response curve of the passband filters which comprise the notch filter circuit illustrated in FIG. 3.

As described above, in the embodiment illustrated in FIG. 3, the course acquisition filter 30 and the narrow tracking filter 32 are implemented using the same basic filter design. Accordingly, the narrow tracking filter 30 comprises the same or similar components to those contained in the coarse acquisition filter 30 with the primary difference between the coarse acquisition filter 30 and the narrow tracking filter 32 being the use of fixed gain weight elements having a gain which differs from the gain of the corresponding fixed gain elements of the coarse acquisition filter 30. In this manner, the bandwidth of the narrow tracking filter is selected to be smaller than that of the course acquisition filter 30 by adjusting the parameters A1 and A2 which determine the bandwidth of the acquisition and tracking filters 30, 32, respectively. The operation of the course acquisition filter 30 and the center frequency control circuit 35 will be described in greater detail below. By using fixed gain weight elements with different gains in each of the filters 30, 32, the passband of the course acquisition filter 30 is made wider than that of the narrow tracking filter 32. For example, in one embodiment of the present invention, as illustrated in FIG. 4, the acquisition filter has a $-3$dB bandwidth 8 times as wide as the narrow tracking filter 32. The ratio between the filter bandwidth is a flexible design parameter which is related to the lowest signal to noise ratio ("SNR") interference signal sought to be canceled.

The narrow tracking filter 32 comprises a recursive digital passband tracking filter circuit 33 and a tracking mode center frequency control circuit 37. The recursive digital passband tracking filter circuit 33 comprises first and second fixed gain weight elements 66, 76 having gains of A2 and (1−A2) respectively, a first and second unit delay element 70, 74, a first through third summer 68, 73, 78 and a first through fourth adjustable weight element 72, 82, 80, 84. The first through fourth adjustable weight elements 72, 82, 80, 84 have a gain of $\sin(\omega(t))$, $\cos(\omega(t))$, $\sin(\omega(t))$, $\cos(\omega(t))$, respectively.

The center frequency control circuit 37 of the narrow tracking filter 32 comprises a cross correlator 86, and a frequency integrator circuit which comprises a sign detector 88, a fixed gain element 90, having a gain of B2, a unit delay element 94 and a summer 92.

Generally, A1 and A2 will have values less than one with A2 being selected to be larger than A1 so that the bandwidth of the tracking filter 32 is narrower than the bandwidth of the acquisition filter 30. The values of B1 and B2 may be the same is course and narrow SIN/COS lookup tables 126, 128 are used. However, if the center frequency control circuits 35, 37 are used to generate actual sin/cos values then B2 should be selected to be smaller than B1 to insure that the center frequency control circuit 37 of the narrow tracking filter 32 adjusts the filters' center frequencies in smaller increments than the center frequency control circuit 35 of the course acquisition filter 30. For example, in one embodiment B1 was selected to equal 1 while B2 was selected to equal 0.1.

The elements comprising the passband tracking filter circuit 33 and tracking frequency control circuit 37 of the narrow tracking filter 32 are connected together in the same or similar manner as described above in regard to the course acquisition filter 30 and as illustrated in FIG. 3.

The center frequency of the course acquisition filter 30 and the narrow tracking filter 32 are controlled by the gains $\sin(\omega(t))$ and $\cos(\omega(t))$ where $(\omega(t))$ is the center frequency of each filter in radians with respect to a normalized sampling rate of $2\pi$. The bandwidth of the acquisition and tracking filters 30, 32 is controlled by the constant parameters A1 and A2, respectively.

In accordance with one embodiment, as illustrated in FIG. 4, the acquisition filter bandwidth is made much larger than the tracking filter bandwidth by the appropriate selection of the parameters A1 and A2. As illustrated in FIG. 4, in one embodiment of the present invention, the acquisition filter 30 is implemented with a $-3$ dB bandwidth 8 times as wide as the tracking filter 32. This exemplary ratio may be altered to permit the cancellation of interference signals with even lower signal to noise ratios. For a 20 MHz sampling rate, the acquisition and tracking filter passbands illustrated in FIG. 4 are 25 and 200 KHz wide, respectively, when A1=0.0078125 and A2=0.0625. These coefficient values correspond to a shift of 8 and 4 bits respectively permitting for their implementation in a weight element without the need for multipliers.

The frequency correction signal output of the narrow tracking filter's frequency control circuit 37 is coupled to the input of the narrow SIN/COS lookup table 128 while the in-phase signal output of the narrow tracking filter 32 is coupled to a second input of the interference detector 34.

Only one of either the acquisition center frequency control circuit 35 or the tracking center frequency control circuit 37, is used at any give time to control the center frequency of both the acquisition filter 30 and tracking filter 32. The frequency control circuits 35, 37 operate by correlating the received quadrature output signal from the corresponding passband filter 31, 33 with the wideband communication signal input to each filter 31, 33. When no narrowband interference signal is present within the passband of the passband filter 31 the frequency integrator which comprises the acquisition filters' center frequency control circuit 35 will not move in any coherent direction since the communication signal will not be able to correlate with the relatively narrow quadrature-phase output signal of the passband filter 31.

Accordingly, when no interference is detected, the center frequencies of the acquisition filter 30 and the tracking filter 32 will be randomly adjusted by the acquisition filter's center frequency control circuit 35. However, when an interference signal is present, the acquisition filter's quadrature-phase output signal will correlate in a coherent fashion with the interference signal causing the center frequencies of the acquisition filter and the tracking filter to be locked onto the frequency of the interference signal. As will be described below, once the interference signal is located within the passband of the narrow tracking filter 33 the tracking filter's center frequency control circuit 37 becomes responsible is for adjusting the center frequencies of the acquisition filter 30 and the tracking filter 32 to insure that the interference signal remains in the tracking filter's passband.

The coarse SIN/COS lookup table 126 and the narrow SIN/COS lookup table 128 are used in providing the $\sin(\omega(t))$ and $\cos(\omega(t))$ values which determine the center frequencies of the acquisition filter 30 and tracking filter 32 to the variable weight elements of the acquisition and tracking fillets.

The coarse SIN/COS lookup table 126 receives the frequency control signal output by the course acquisition filter's frequency control circuit 35 and performs a sin/cos lookup operation using the received frequency control signal. The lookup operation is used to generate $\sin(\omega)(t)$ and $\cos(\omega(t))$ values which are supplied to a first input of the second switch 130.

In one embodiment of the present invention, the frequency control circuits 35, 37 are used to generate actual sine and cosine values which are then supplied to lookup tables. However, in another embodiment, the values output by the frequency control circuits 35, 37 merely serve as indexes to the SIN/COS lookup tables 126, 128 which then supply actual sine and cosine values. In such an embodiment, B1 and B2 may be integers, for example 1. In such a case, each increment in the value of the frequency control signal indicates to the SIN/Cos lookup table 126, 128 that the next subsequent value in the SIN/COS lookup table should be used while each decrement in the frequency control signal value would indicate that the preceding SIN/COS value in the SIN/COS lookup table 126, 128 should be used.

In a similar manner, the narrow SIN/COS lookup table 128 receives the frequency control signal output by the narrow tracking filter's frequency control circuit 37 and performs a sin/cos lookup operation as a function of the value represented by the received frequency control signal. The lookup operation is used to generate $\sin(\omega(t))$ and $\cos(\omega(t))$ values which are supplied to a second input of the second switch 130.

The coarse SIN/COS lookup table 126 and the narrow SIN/COS lookup table 128 each contain a series of sine and cosine values which are used to generate the output signals supplied to the second switch 130. However, the increments between values stored in the coarse SIN/COS lookup table is greater than the increments between the values stored in the narrow SIN/COS lookup table 128. Accordingly, when the output of the coarse SIN/COS lookup table is used to adjust the gain of the adjustable weight elements of the coarse acquisition filters 30, 32 the increments by which the center frequency of the filters 30, 32 will be changed is greater than when the values from the narrow SIN/COS lookup table 128 are used.

The second switch 130 has a control signal input coupled to a switch control signal output of the interference detector 34. When the output of the interference detector 34 indicates that no interference is present the second switch 130 is positioned to connect the output of the course SIN/COS lookup table to a gain control input of each of the adjustable weight elements 42, 44, 50, 54, 72, 74, 80, 82. However, when the presence of interference is detected, the switch 130 is positioned to couple the output of the narrow SIN/COS lookup table to the gain control input of each of the adjustable weight elements 42, 44, 50, 54, 72, 74, 80, 82.

Thus, during interference acquisition mode of operation, i.e., when no interference is detected, the center frequencies of the filters 30, 32 will be adjusted in greater increments to facilitate rapid scanning for, and acquisition of, the interference signal. However, once interference is detected the output of the narrow SIN/COS lookup table 128 is used to adjust the center frequency of the filters 30, 32 to correspond to the frequency of the detected interference signal.

The exemplary embodiment of the interference detector circuit 34 illustrated in FIG. 3 will now be described in detail. The interference detector circuit 34 comprises a wideband power estimation circuit 100 for estimating the power of the in-phase signal output by the course acquisition filter 30, a difference power estimation circuit 102 for estimating the power of the in-phase signal output by the course acquisition filter 30 minus the in-phase signal output by the narrow tracking filter 32, and a threshold compare circuit 124 for comparing the two estimated power levels.

The wideband power estimation circuit 100 comprises a squarer 104, a first and second fixed weight element 106, 110, a summer 108, and a unit delay element 112. The squarer 104 has a pair of inputs coupled to the output of the in-phase signal output of the course acquisition filter 30 and an output coupled to the input of the first fixed weight element 106 which has a fixed gain of C wherein C is a predetermined fixed value. The output of the fixed weight element 106 is coupled to a first input of a summer 108. A power level signal output of the summer 108 is coupled to a first input of the threshold compare circuit 124 and to the input of the unit delay element 112. The output of the unit delay element 112 is coupled to the input of the second fixed gain element 110 which has a gain of $(1-C)$. The second fixed gain element 110 has an output coupled to a second input of the summer 108.

The value of C is used to control the bandwidth of the interference detector circuit 34. Accordingly, the bandwidth of the interference detector 34 may be controlled by selecting various values for C. For example, in one embodiment using a 20 MHz sampling rate, a value of 0.0001 was determined to be an acceptable value for C.

The design of the difference power estimation circuit 102 is similar to that of the wideband power estimation circuit 100. The difference power estimation circuit 102 comprises a first and second summer 103, 118, a squarer 114, a first and second fixed gain weight element 116, 120 and a unit delay element 122, which has a gain of $1-C$.

A summing input of the difference power estimation circuit's first summer 103 is coupled to the in-phase signal output of the course acquisition filter 30 while a subtracting input of the first summer 103 is coupled to the in-phase signal output of the narrow tracking filter 32. The first summer 103 subtracts the in-phase signal output by the narrow tracking filter 32 from the in-phase signal output by the course acquisition filter 30 to generate a difference signal. A difference signal output of the first summer 103 is coupled to the first and second inputs of the squarer 114 which, in turn has an output coupled to the input of the first fixed weight element 116. The first fixed weight element 116, which has a gain of C, has an output coupled to a first input of the second summer 118. The output of the second summer 118 is coupled to the second input of the threshold compare circuit 124 and to the input of the first unit delay element 122.

In this manner, the threshold compare circuit 124 and the unit delay element 122 each receive the signal output by the summer 118 which represents the estimated power of the difference signal. The output of the unit delay element 122 is coupled to the input of the second fixed gain element 120 which, in turn, has an output coupled to a second input of the summer 118.

The threshold compare circuit 124 receives the power estimation signals output by the wideband power estimation circuit 100 and the difference power estimation circuit 102. By comparing the two signals the threshold compare circuit 124 determines if an interference signal is present within the passband of the narrow tracking filter 32.

A detection signal indicating that an interference signal has been detected within the passband of the tracking filter 32 is generated by the threshold compare circuit if the ratio of the estimated power ("PAF") of the in-phase signal output by the course acquisition filter 30, to the estimated power ("PD") of the difference signal, exceeds a predetermined threshold indicative of the presence of an interference signal. For example, if the passband of the acquisition filter is 8 times wider than the passband of the tracking filter, a power ratio (PAF:PD) of approximately 7:8 is expected when no interference is present. If an interference signal is present within the passband of both the acquisition and tracking filters 31, 33 the ratio will be much higher. Accordingly, in the exemplary embodiment a power ratio (PAF:PD) of greater than 7:8 may be used as indicating the presence of an interference signal within the passband of the tracking filter 32.

When the threshold compare circuit 124 detects a power ratio (PAF:PD) indicative of the presence of an interference signal within the passband of the tracking filter 33, the threshold compare circuit 124 outputs a detection signal which indicates the presence of an interference signal. However, when the power ratio (PAF:PD) does not indicate the presence of a narrowband interference signal, the threshold compare circuit 124 generates a detection signal indicating that no interference has been detected.

Thus, the threshold compare circuit 124 generates and outputs a detection signal which indicates whether an interference signal is present within the passband of the tracking filter 33.

The detection signal output of the threshold compare circuit 124 serves as the output of the interference detector circuit 34. The output of the interference detector circuit 34 is coupled to a control input of the first switch 122 and the second switch 130. Thus, the output of the interference detector circuit 34 is used to control the position of the first and second switches 122, 130.

The second switch 130 has a first input coupled to the output of the coarse SIN/COS lookup table 126 and a second input coupled to the output of the narrow SIN/COS lookup table 128. The output of the switch 130 is coupled to a gain control input of each of the adjustable weight elements 42, 50, 52, 54, 72, 80, 82, 84 of the acquisition filter 30 and the tracking filter 32. Accordingly, the acquisition filter 30 and the tracking filter 32 are gang tuned via the switch 130 so that the center frequencies of the passband filters 31, 33 of both the acquisition filter 30 and tracking filter 32 are adjusted in unison.

When the detection signal output by the interference detection circuit 34 indicates that an interference signal is present in the tracking filter's passband, the second switch 130 operates to couple the output of the narrow SIN/COS lookup table 128 to the gain control input of each of the adjustable weight elements of the acquisition filter 30 and tracking filter 32. However, when the detection signal indicates that no interference signal has been detected, the second switch 130 couples the output of the course SIN/COS lookup table 126, as opposed to the output of the narrow lookup table 128, to the gain control inputs of the adjustable weight elements of both the acquisition filter 30 and tracking filter 32.

In this manner, when no interference signal is detected, i.e., during acquisition mode, the center frequency control circuit 35 of the acquisition filter 30 controls the adjustment of the center frequencies of both the acquisition filter 30 and tracking filter 32 via the coarse SIN/COS lookup table 126. However, once an interference signal has been detected, the tracking filter's center frequency control circuit 37 is used to control the center frequency of the tracking filter 32 and the acquisition filter 30 via the narrow SIN/COS lookup table 128.

Thus, during acquisition mode, because of the use of the coarse SIN/COS lookup table, the center frequencies of the acquisition filter 30 and tracking filter 32 will be changed at a faster rate than during tracking mode when the narrow SIN/COS lookup table 128 is used. This facilitates faster acquisition and look-on of the interference signal than would be possible using only the narrow SIN/COS lookup table 128.

In addition to controlling the position of the second switch 134, the interference detection signal is used to control the position of the first switch 132. As will be described below, the position of the first switch 132 determines whether the communication signal received at the input 13 of the filter circuit 11 will be passed directly to the filter circuit's output 15 without attenuation or if a detected narrowband interference signal in the communication signal will be attenuated.

The first switch 132 has an input terminal coupled to the in-phase signal output of the tracking filter 32 and an output terminal coupled to a subtracting input of the summer 134. In addition, the summer 134 has a summing input coupled to the signal input 13 of the filter circuit 11 and an output coupled to output 15 of the filter circuit 11.

The summer 134 generates the signal output by the filter circuit 11 by passing the communication signal received at its input to its output when the first switch 132 is open, and thus the in-phase signal output of the narrow tracking filter 32 is not connected to the subtracting input of the summer 134. In this manner, the notch filter circuit 11 effectively disconnects itself when no interference is detected. However, when the first switch 132 is closed, i.e., when the detection signal indicates that interference has been detected within the narrow tracking filter's passband, the summer 134 receives the in-phase signal output by the narrow tracking filter 32 and subtracts it from the communication signal to generate the output signal supplied to the output 15 of the filter circuit 11.

Accordingly, when the interference detector circuit 34 detects the presence of interference, the signal output by the narrow tracking filter 32, which includes all or a portion of the detected narrowband interference signal, is subtracted from the communication signal received at the input of the filter circuit 11. In this manner, when interference is detected, the filter circuit 11 operates as a notch filter.

I claim:

1. A narrowband interference canceler for filtering a wideband communication signal to remove narrowband interference, the interference canceler comprising:

a recursive digital notch filter circuit for processing the communication signal by receiving the communication signal, by detecting the presence of a narrowband interference signal and by attenuating each detected narrowband interference signal, the recursive digital notch filter including:

i. a communication signal input for receiving the communication signal;

ii. a communication signal output for outputting the processed communication signal;

iii. an acquisition mode filter center frequency control circuit coupled to the communication signal input for generating a acquisition mode filter center frequency control signal as a function of the communication signal;

iv. a recursive digital passband tracking filter circuit coupled to the communication signal for filtering the communication signal to generate an in-phase output signal and a quadrature phase output signal, the passband tracking filter circuit having an adjustable center frequency, a center frequency control signal input, an in-phase signal output and a quadrature-phase signal output;

v. a tracking mode filter center frequency control circuit coupled to the communication signal input and the quardature-phase signal output of the passband tracking filter circuit, for generating a tracking mode center frequency filter control signal;

vi. an interference detection circuit coupled to the in-phase signal output of the passband tracking filter circuit for detecting the presence of a narrowband interference signal in the in-phase signal output by the passband tracking filter circuit and for asserting an interference detection signal when an interference signal has been detected;

vii. means selectively coupling the tracking mode filter center frequency control circuit to an acquisition filter center frequency control signal input and the passband tracking filter center frequency control signal input when the detection signal is asserted; and viii. a summer coupled to the communication signal input and the communication signal output and selectively coupled to the in-phase signal output of the passband tracking filter circuit when the detection signal is asserted, the summer for generating the processed communication signal by subtracting the in-phase signal output by the passband tracking filter circuit from the communication signal when the detection signal is asserted and by passing the communication signal to the communication signal output when the detection signal is de-asserted.

2. The narrowband interference canceler of claim 1, wherein the recursive digital notch filter circuit further comprises:
a recursive digital passband acquisition filter circuit coupled to the communication signal input for receiving and filtering the communication signal to generate an in-phase output signal and a quadrature-phase output signal, the passband acquisition filter circuit having a passband with an adjustable center frequency, a center frequency control signal input, an in-phase signal output and a quadrature-phase signal output; and
wherein the acquisition mode filter center frequency control circuit is further coupled to the quadrature-phase signal output of the passband acquisition filter circuit for receiving the quardature-phase signal output by the passband acquisition filter circuit and for generating the acquisition mode filter center frequency control signal as a function of both the quadrature-phase signal output by the pass-band acquisition filter circuit and the communication signal.

3. The narrowband interference canceler of claim 2, further comprising:
means for selectively coupling the acquisition made filter center frequency control circuit to the passband acquisition filter center frequency control signal input and the passband tracking filter center frequency control signal input when the detection signal is de-asserted.

4. The narrowband interference canceler of claim 2, wherein said means for selectively coupling the tracking mode filter center frequency control circuit when the detection signal is asserted, comprises a narrow SIN/COS lookup table and a switch.

5. The narrowband interference canceler of claim 4, wherein said means for selectively coupling the acquisition mode filter center frequency control circuit when the detection signal is de-asserted, comprises a course SIN/COS lookup table.

6. The narrowband interference canceler of claim 5, wherein the interference detection circuit comprises:
a first power estimation circuit coupled to the in-phase output of the passband acquisition filter circuit; and
a difference power estimation circuit coupled to the in-phase output of the passband acquisition filter circuit and the in-phase output of the passband tracking filter circuit,
the interference detection circuit estimating the power of the in-phase signal output by the passband acquisition filter circuit and the power of a difference signal generated by subtracting the in-phase signal output by the passband acquisition filter circuit from the in-phase output of the passband tracking filter circuit and asserting the detection signal when the ratio of the estimated power of the in-phase signal output by the acquisition filter exceeds the power of the difference signal by a predetermined amount indicative of the presence of an interference signal.

7. A narrowband interference canceler for filtering a wideband communication signal to remove narrowband interference, the interference canceler comprising:
a plurality of serially connected recursive digital notch filter circuits, each notch filter circuit for receiving a communication signal and for processing the received communication signal to generate a communication output signal by checking a preselected frequency band of the received communication signal for a narrowband interference signal and for attenuating each detected narrowband interference signal, each recursive digital notch filter including:

i. a communication signal input for receiving a communication signal, the first notch filter circuit in the series of notch filter circuits receiving said communication signal, each subsequent notch filter circuit in the series of notch filter circuit receiving the communication signal output by a preceding notch filter circuit in the series of notch filter circuits;

ii. a recursive digital passband acquisition filter circuit coupled to the received communication signal input for receiving and filtering the communication signal to generate an in-phase output signal and a quardature-phase output signal, the passband acquisition filter circuit having a fixed width passband with an adjustable center frequency, a center frequency control signal input, an in-phase signal output and a quadrature-phase signal output;

iii. an interference acquisition mode center frequency control circuit coupled to the communication signal input and the quadrature-phase signal output of the passband acquisition filter circuit for generating an acquisition mode filter center frequency control signal as a function of the quadrature-phase signal output by the passband acquisition filter circuit and the received communication signal;

iv. a recursive digital passband tracking filter circuit coupled to the communication signal input for filtering the communication signal to generate an in-phase output signal and a quadrature-phase output signal, the passband tracking filter circuit having an adjustable center frequency and a fixed width passband that is narrower than the fixed width passband of the passband acquisition filter circuit, a center frequency control signal input, an in-phase signal output and a quadrature-phase signal output;

v. an interference tracking mode center frequency control circuit coupled to the communication signal input and the quadrature-phase signal output of the passband tracking filter circuit for generating a tracking mode center frequency filter control signal as a function of the quadrature-phase signal output by the passband tracking filter circuit and the received communication signal;

vi. an interference detection circuit coupled to the in-phase signal output of each of the passband tracking filter circuit and the passband acquisition filter circuit, for detecting the presence of a narrowband interference signal in the in-phase signal output by the passband tracking filter circuit and for asserting an interference detection signal when an interference signal has been detected;

vii. means for selectively coupling the tracking mode center frequency control circuit to the passband acquisition filter center frequency control signal input and the passband tracking filter center frequency control signal input when the detection signal is asserted and for coupling the acquisition mode filter center frequency control circuit to the passband acquisition filter center, frequency control signal input and passband tracking filter center frequency control signal input, when the detection signal is de-asserted; and viii. means for subtracting the in-phase signal output by the passband tracking filter circuit from the communication signal to generate a communication output signal when the detection signal is asserted and for passing the communication signal without attenuation to generate the communication output signal when the detection signal is de-asserted.

8. The narrowband interference canceler of claim 7, wherein the recursive digital passband acquisition filter circuit comprises a bi-quadratic recursive digital passband filter circuit having a phase shift of approximately zero at the center frequency of the bi-quadratic recursive digital passband filter circuit.

* * * * *

UNITED STATES PATENT AND TRADEMARK OFFICE
CERTIFICATE OF CORRECTION

PATENT NO.   : 5,325,204
DATED        : June 28, 1994
INVENTOR(S)  : SCARPA, Carl G.

It is certified that error appears in the above-indentified patent and that said Letters Patent is hereby corrected as shown below:

Column 1, line 40, change "by,is e.g.," to --by, e.g.,--;

Column 2, line 40, change "an-embodiment" to --an embodiment--;

Column 2, line 67, change "fines" to --finer--;

Column 4, line 40, change "with is" to --with--;

Column 6, line 49, change "Bl.the" to --Bl.--;

Column 13, line 56, change "made" to --mode--;

Column 13, line 14, change "means" to --means for--;

Column 16, line 6, change "center," to --center--;

Column 16, line 7, change "and" to --and the--.

Signed and Sealed this

Twenty-fifth Day of October, 1994

Attest:

BRUCE LEHMAN

Attesting Officer     Commissioner of Patents and Trademarks